March 16, 1943. E. R. SMITH ET AL 2,314,250
RELEASE DEVICE FOR TAPER LATHES
Filed Dec. 2, 1941 2 Sheets-Sheet 2
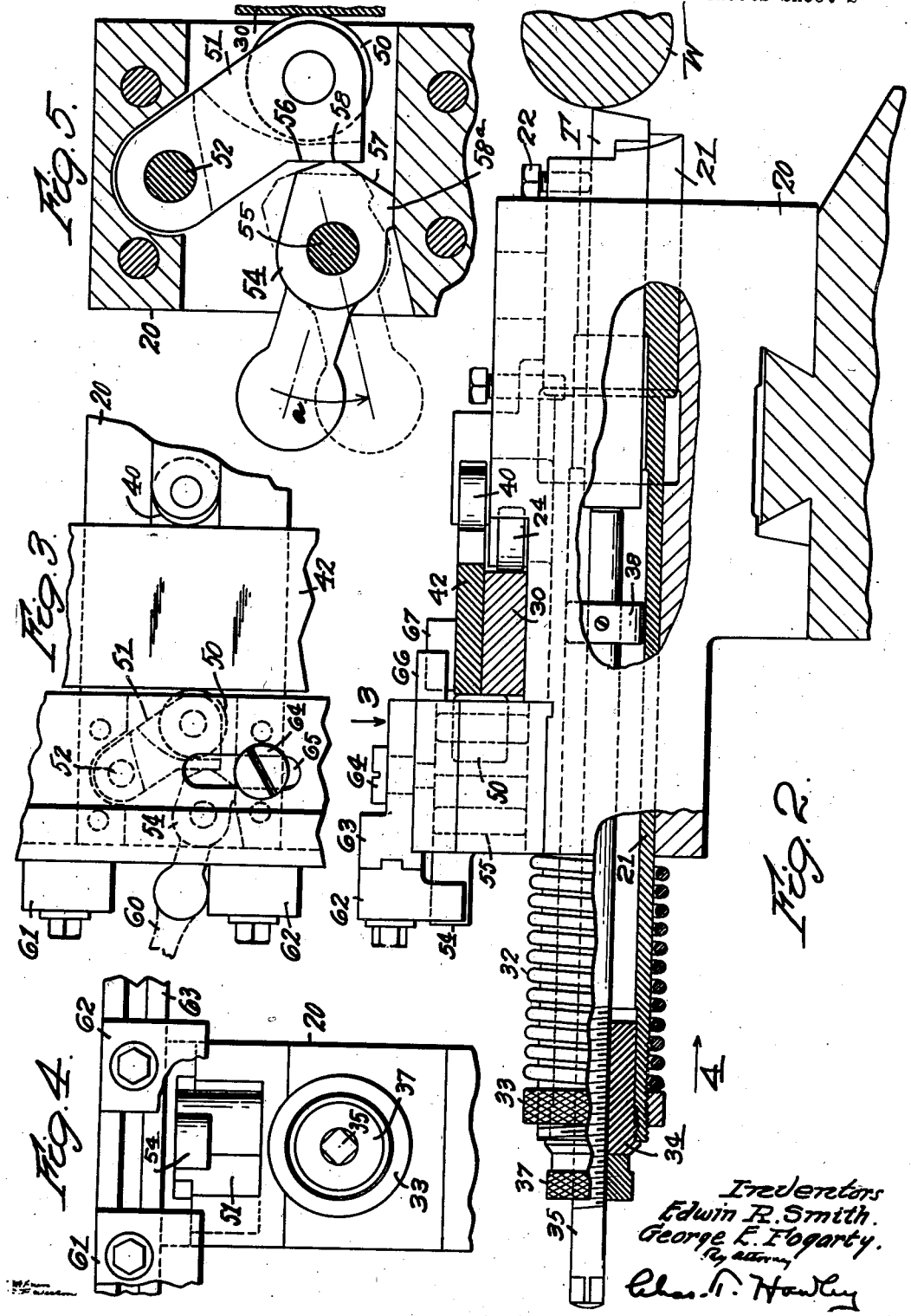
Inventors
Edwin R. Smith.
George E. Fogarty.

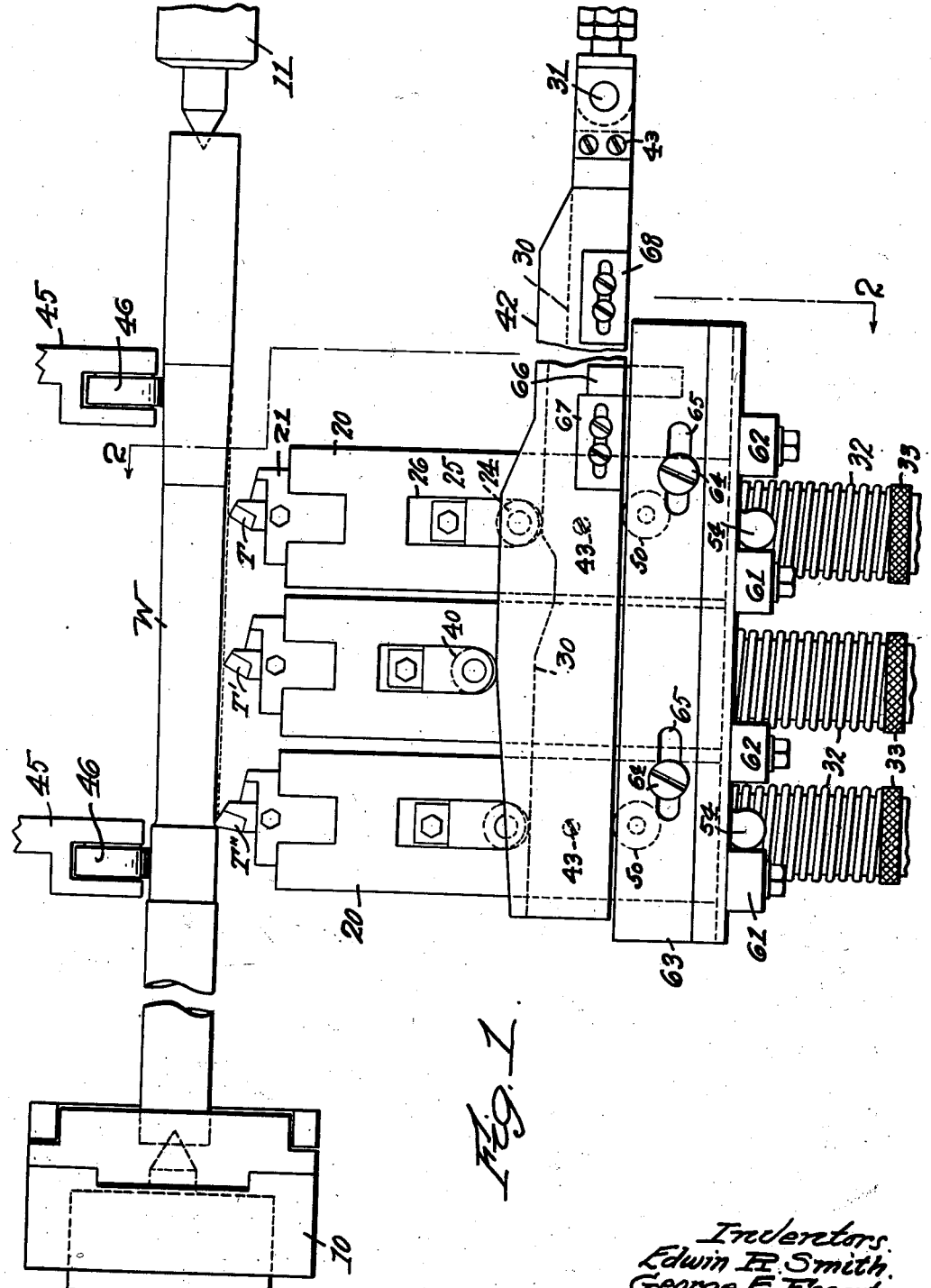

Patented Mar. 16, 1943

2,314,250

UNITED STATES PATENT OFFICE 2,314,250

RELEASE DEVICE FOR TAPER LATHES

Edwin R. Smith and George E. Fogarty, Seneca Falls, N. Y., assignors to Seneca Falls Machine Company, Seneca Falls, N. Y., a corporation of Massachusetts Application December 2, 1941, Serial No. 421,360

1 Claim. (Cl. 82—14)

This invention relates to lathes in which the radial position of a cutting tool is controlled by a taper bar. In such lathes, it is desirable to withdraw the tool from cutting position at the completion of a cutting stroke and during a return movement of the tool carriage, but without changing the tool setting.

It is the general object of our invention to provide a device by which such a tool may be conveniently released and removed from cutting position when desired, while at the same time the tool setting is preserved.

It is a further object of our invention to provide a release device which may be automatically actuated to release the tool at a predetermined point in the operation of the lathe.

Our invention further relates to arrangements and combinations of parts which will be hereinafter described and more particularly pointed out in the appended claims.

A preferred form of the invention is shown in the drawings, in which:

Fig. 1 is a plan view of parts of a taper lathe embodying our improvements;

Fig. 2 is a side elevation, partly in section, and taken along the line 2—2 in Fig. 1;

Fig. 3 is a partial plan view, looking in the direction of the arrow 3 in Fig. 2;

Fig. 4 is a partial front elevation, looking in the direction of the arrow 4 in Fig. 2; and Fig. 5 is an enlarged sectional plan view of certain parts appearing in Fig. 3.

Referring to the drawings, we have shown our invention embodied in a taper lathe which may be in general of a usual commercial construction, and in which the work W is supported on centers in a lathe head 10 and tail stock 11. The work may be gripped and rotated in any usual and convenient manner.

As shown in the drawings, the lathe is provided with three cutting tools T, T' and T'', but the invention is not limited to the use of three tools and may be embodied in a lathe using a single tool or any other desired number of tools.

Details of construction of the tool carriage and one of the tool holders are shown in Fig. 2, in which the carriage or slide 20 supports a sleeve 21 adapted to slide radially toward and from the work W. The sleeve 21 is provided with a longitudinal opening to receive a tool T, and with a binding screw 22 to hold the tool in position.

A roll 24 is mounted on a bracket 25 (Fig. 1) secured to the sleeve 21 and slidable in an elongated recess 26 in the carriage or slide 20. The sleeve and tool are thus held from rotational movement in the carriage or slide but are left free to move radially of the work.

The roll 24 engages the rear surface of a taper bar 30 which is adapted to swing about a fixed pivot 31 (Fig. 1) but which is held thereby from axial movement in the lathe. The roll 24 is pressed firmly against the taper bar 30 by a heavy coil spring 32, interposed between the front end of the slide 20 and a nut 33 threaded on the forward end of the sleeve 21.

A plug 34 is threaded in the forward end of the sleeve 21 and is itself threaded to receive a stop rod 35, which extends into the sleeve 21 far enough to engage the front end of the tool T, as shown in Fig. 2. The forward end of the stop rod 35 is machined to receive a wrench by which the rod may be conveniently adjusted, and a lock nut 37 preserves the adjustment. The rear end of the rod 35 is preferably supported by a guide collar 38, freely slidable in the sleeve 21.

Where a plurality of tools and tool holders or sleeves are used, one or more of the sleeves may be provided with a roll 40 (Figs. 1 and 2) mounted in a higher position than the roll 24 and coacting with an upper taper bar 42, mounted above the taper bar 30 but preferably secured thereto as by screws 43. The usual steady rests 45 may be mounted at the back of the lathe and may be provided with rolls 46 engaging and supporting the work W.

The parts thus far described are in general of a usual commercial construction, except for the swinging connection of the taper bars to the fixed pivot 31.

We will now describe our improved device for operatively positioning the taper bars and for releasing them from operative position when desired.

For this purpose, we provide rolls 50 (Figs. 2, 3 and 5) mounted on arms 51 pivoted at 52 in the tool carriage or slide 20. A release lever 54 is provided for each roll 50 and arm 51, and each release lever is mounted on a stud 55 fixed in the carriage or slide 20.

Each arm 51 has a bearing surface 56 (Fig. 5) adapted to be selectively engaged by cam surfaces 57 and 58 on the release lever 54. The surface 58 is at a greater distance from the pivotal center of the lever 54 than is the surface 57. Each lever 54 also has a stop face 58a (Fig. 5) which determines its operative position.

When the levers 54 are in the full line position shown in Fig. 5, the arms 51 and rolls 50 are projected rearward, and the taper bars 30 and 42 are held in the operative positions shown in Figs.

1 and 2. If the release levers 54 are swung to the dotted line position shown in Fig. 5, the taper bars will be free to move forward a limited distance, such as 1/16 or 3/32 of an inch, and the springs 32 will promptly withdraw the cutting tools radially from engagement with the work.

The release levers 54 may be provided with handles as indicated at 60 in Fig. 3 for manual operation but are preferably operated by dogs 61 and 62 (Fig. 4) adjustable in a guideway on a plate 63 (Figs. 2 and 3), which plate is slidably secured to the top of the slide or carriage 20 by bolts 64 (Fig. 1) extending through slots 65.

An arm 66 extends rearward from the slide 63 and is adapted to be engaged by blocks 67 and 68, adjustably secured on the top of the taper bar 42 and hence held from axial movement in the lathe.

As the tool carriage 20 is moved toward the head stock by any usual feeding mechanism, the arm 66 will engage the fixed block 67 at a predetermined point, after which the slide 63 and dogs 61 and 62 will remain stationary while the carriage 20 and release levers 54 will continue to move to the left in Fig. 1.

The release levers will thus be swung as indicated by the arrows a in Fig. 5 from the full-line operative position to the dotted line inoperative position. The taper bars and the tools positioned thereby will thus be promptly released as soon as the raised portion 58 of each release lever 54 passes the dead center between its stud 55 and the axis of its associated roll 50.

When the carriage is returned or moved to the right in Fig. 1, the arm 66 will engage the fixed block 68, after which the dog 62 will operate to restore the release levers 54 to the full-line operative positions shown in Figs. 3 and 5.

We have thus provided simple and convenient mechanism by which one or more taper bars may be projected rearward to operative position and may be released at a predetermined point. When so released, the tool setting is kept intact and the tools may be accurately restored to cutting position by merely shifting the release levers, either manually or automatically, to operative position.

Our improved release device is an important development even when manually operated but is of substantially greater importance when operated automatically as also herein disclosed.

Having thus described our invention and the advantages thereof, we do not wish to be limited to the details herein disclosed, otherwise than as set forth in the claim, but what we claim is:

In a taper lathe having a rotated work piece and a cutting tool, in combination, a tool carriage movable axially of said lathe, a tool holder movable radially of the rotated work-piece, a taper bar, means to hold said taper bar from axial movement in said lathe but leaving said bar free to swing toward and from the work, yielding means to draw the tool holder against the taper bar and to draw the tool holder and taper bar away from the work, a pair of positioning levers mounted on axially separated pivots on said carriage and each having two cam surfaces spaced at greater and less distances from its pivot and coacting with a bearing surface on said taper bar, a pair of dogs engaging each lever and effective to shift said levers and advance or withdraw said taper bar and tool holder with respect to the work, a plate on which said dogs are adjustably secured, said plate being mounted on the tool carriage but slidable axially relative thereto, and additional dogs adjustably mounted on said taper bar and engaging a portion of said plate to slide said plate relative to said carriage and to thereby shift said positioning levers to advance or withdraw said taper bar a predetermined slight distance relative to the work and at predetermined points in the travel of the carriage.

EDWIN R. SMITH.
GEORGE E. FOGARTY.